(12) United States Patent
Head

(10) Patent No.: US 9,770,087 B2
(45) Date of Patent: Sep. 26, 2017

(54) ADJUSTABLE STAND FOR BARBEQUE GRILLS AND OTHER CAMPING GEAR

(71) Applicant: David Head, Elgin, IL (US)

(72) Inventor: David Head, Elgin, IL (US)

( * ) Notice: Subject to any disclaimer, the term of this patent is extended or adjusted under 35 U.S.C. 154(b) by 0 days.

(21) Appl. No.: 15/249,383

(22) Filed: Aug. 27, 2016

(65) Prior Publication Data
US 2017/0055685 A1    Mar. 2, 2017

Related U.S. Application Data

(60) Provisional application No. 62/210,679, filed on Aug. 27, 2015.

(51) Int. Cl.
| | |
|---|---|
| *A47J 37/00* | (2006.01) |
| *F24B 3/00* | (2006.01) |
| *E04H 12/22* | (2006.01) |
| *F16M 11/16* | (2006.01) |
| *F16M 11/28* | (2006.01) |
| *F16M 11/04* | (2006.01) |
| *A45F 3/44* | (2006.01) |
| *A47J 37/07* | (2006.01) |
| *A45F 3/46* | (2006.01) |
| *E02D 5/80* | (2006.01) |

(52) U.S. Cl.
CPC ............ *A45F 3/44* (2013.01); *A45F 3/46* (2013.01); *A47J 37/0786* (2013.01); *F16M 11/041* (2013.01); *F16M 11/16* (2013.01); *F16M 11/28* (2013.01); *A47J 2037/0795* (2013.01); *E02D 5/80* (2013.01); *E04H 12/22* (2013.01); *F16M 2200/028* (2013.01)

(58) Field of Classification Search
CPC   E02D 5/80; E02D 5/801; E04H 12/22; E04H 12/223; E04H 12/2215; A47J 37/0763; A47J 37/0781; A47J 2037/0795; A47F 3/44; F16M 11/041; F16M 11/16; F16M 11/28
USPC ....... 248/156, 545, 546, 688, 522, 530, 532, 248/499, 176.2, 206.5, 219.2, 309.4, 345, 248/508; 52/155, 157, 165; 114/294, 114/295; 126/130, 41 R, 25 R; 43/21.2; 47/42, 47
See application file for complete search history.

(56) References Cited

U.S. PATENT DOCUMENTS

| | | | | |
|---|---|---|---|---|
| 3,308,804 A | * | 3/1967 | Euliss | A47J 37/0786 126/25 R |
| 4,896,651 A | * | 1/1990 | Kott, Jr. | F24B 1/205 126/30 |
| 4,979,490 A | * | 12/1990 | Nudo | F24B 1/205 126/25 A |
| 5,666,940 A | * | 9/1997 | Kreiter | A47J 33/00 126/25 A |
| 5,819,720 A | * | 10/1998 | Schubert | F24C 1/16 126/25 R |

(Continued)

*Primary Examiner* — Tan Le
(74) *Attorney, Agent, or Firm* — Steven Ivy P.C.

(57) ABSTRACT

A support stand for barbeque grills and camping gear, incorporating a telescoping, height-adjustable tube, with two ends, wherein the first end has been designed to accept, for positioning on the ground, an auger bit or a land stand, and the second end has been designed to accept an interchangeable mounting hub utilizing either screws or collapsible magnetic arms to hold barbeque grills and other camping gear.

3 Claims, 6 Drawing Sheets

(56) References Cited

U.S. PATENT DOCUMENTS

| | | | | |
|---|---|---|---|---|
| 6,058,662 A | * | 5/2000 | Perko | E02D 5/801 |
| | | | | 405/232 |
| 9,464,397 B1 | * | 10/2016 | Abraham | E02D 5/801 |
| 2014/0007487 A1 | * | 1/2014 | Schwiebert | E04H 12/2238 |
| | | | | 43/21.2 |
| 2017/0055685 A1 | * | 3/2017 | Head | A45F 3/44 |

* cited by examiner

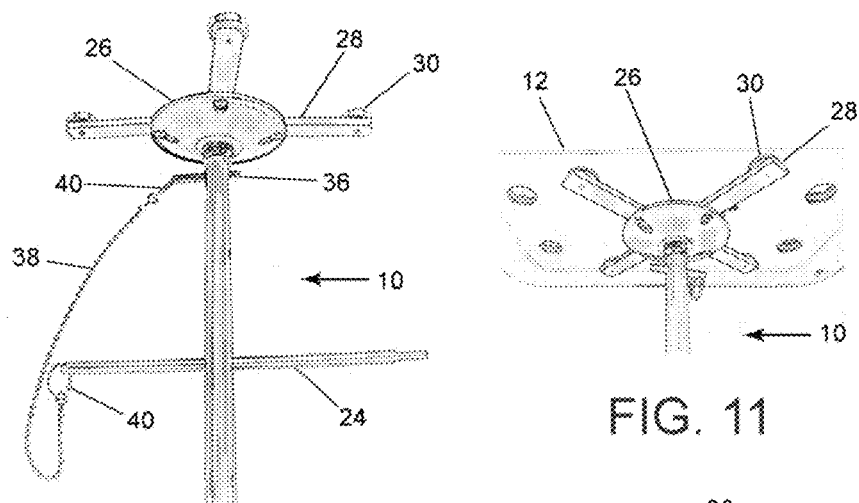
FIG. 10
FIG. 11
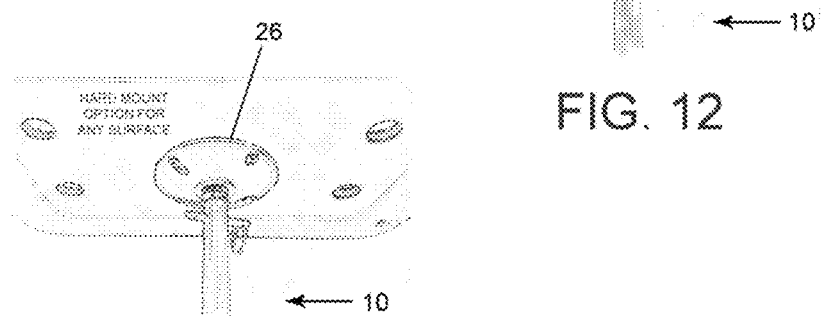
FIG. 12
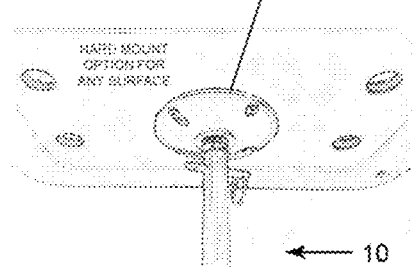
FIG. 13

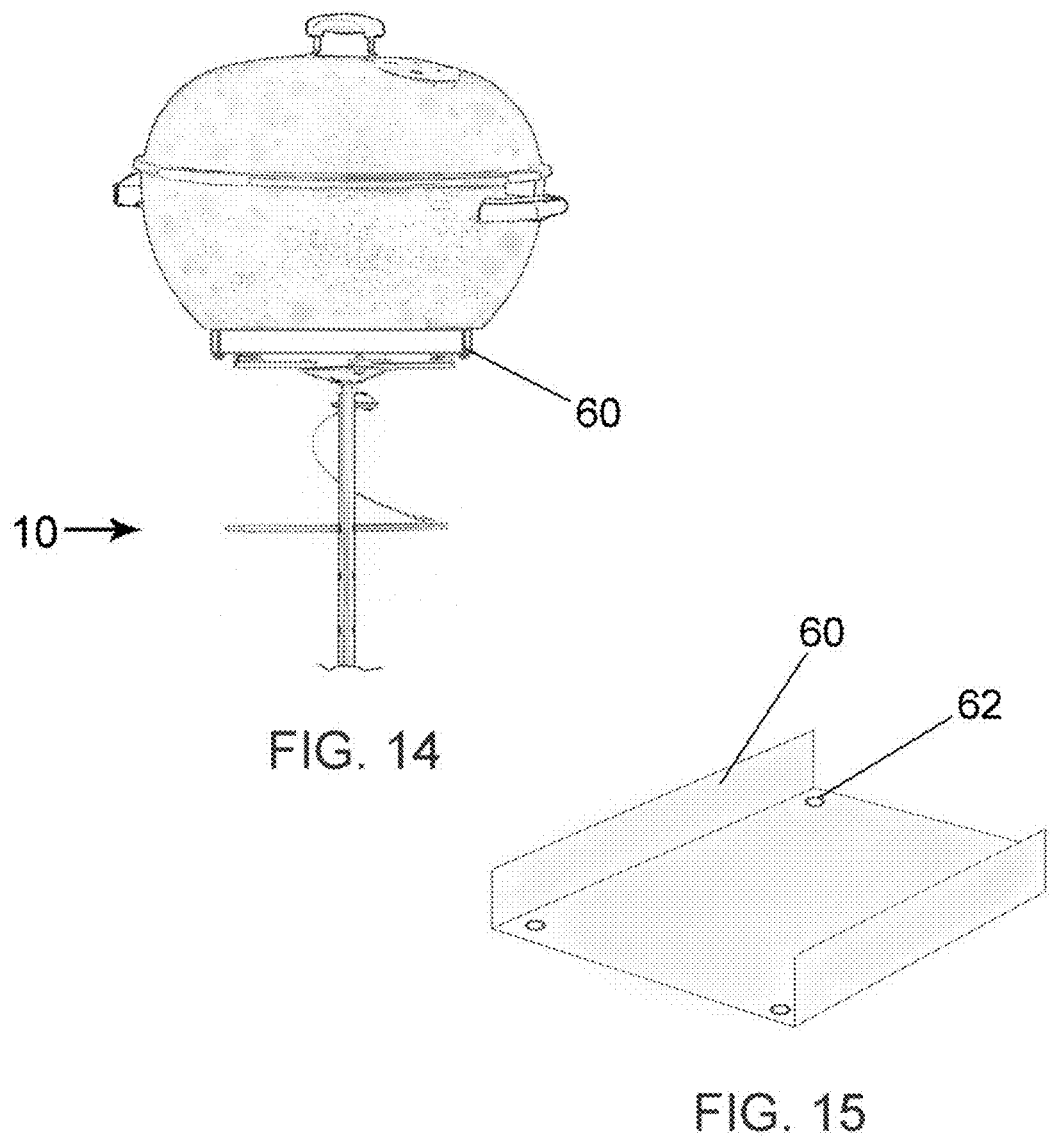

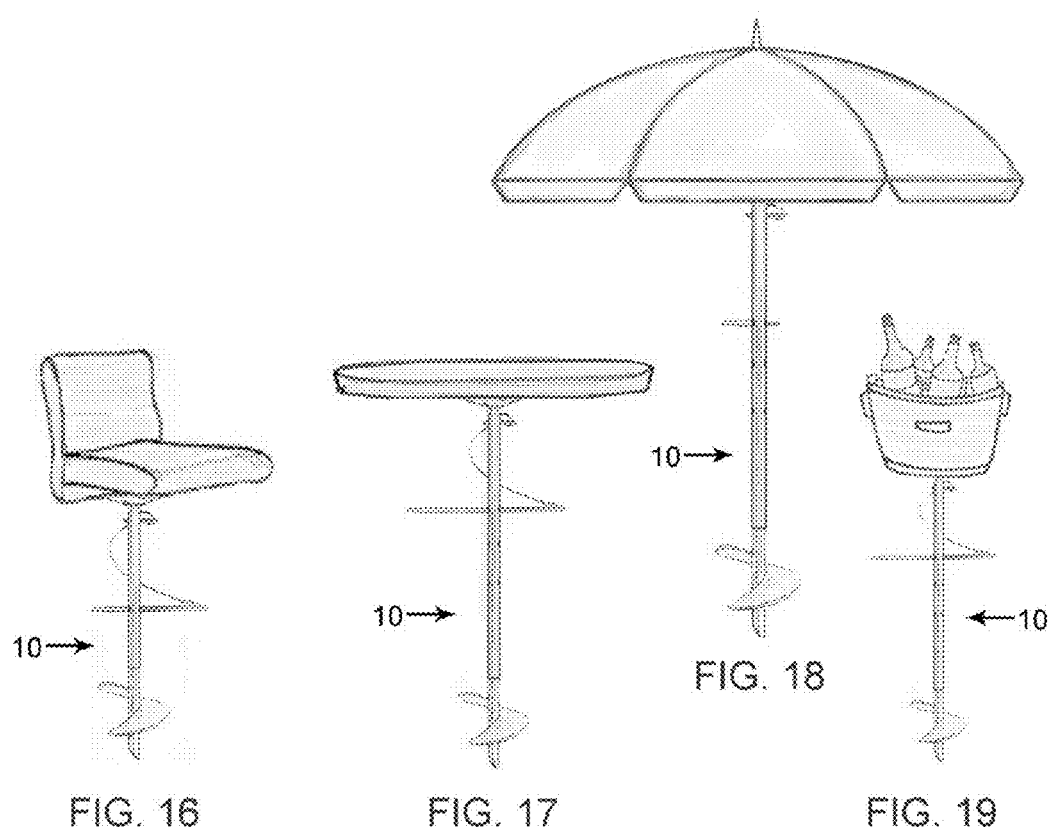

ADJUSTABLE STAND FOR BARBEQUE GRILLS AND OTHER CAMPING GEAR

RELATED PATENT APPLICATION

The present Non-Provisional U.S. Patent Application is based upon U.S. Provisional Patent Application No. 62/210,679 filed Aug. 27, 2015, the subject matter of which is incorporated herein by reference.

FIELD OF THE INVENTION

This invention pertains to camping, fishing and boating equipment. Specifically, the invention addresses a new way of supporting various portable camping accessories such as barbecue grills, picnic tables, food trays, portable bars and coolers.

BACKGROUND OF THE INVENTION

According to research reports summarized in the American Camper Reports, over 40 million American participate regularly in camping activities. On average, campers traveled more than 180 miles to get to their desired camping spot, which tended to be a private or a state park campground. Each camping participant, whether staying in a tent, RV, cabin, spent an average of 15 days camping per year. This continued interest in camping activities, combined with the related traveling requirements, has ushered an increase in popularity, and development of new portable camping gear; more specifically portable grills, coolers and picnic furniture.

The popularity of said portable camping gear has increased the consumer demand for new products, saturating the market with various portable camping equipment, such as barbeque grills and picnic tables. Most of these camping products, however, are not very robust and are difficult to assemble. They offer limited height adjustability, require a significant setup space and must be placed on a relatively firm and dry terrain. This invention was created to address, and to resolve, all of these issues by offering a robust and adjustable camping equipment mounting platform that can be utilized in the water and on any dry terrain.

Examples of prior-art, focusing on products providing some form of support for barbeque grills and other camping gear may be found in the following U.S. Patent Applications: 2002,0020,405; 2011,0079,209; 2014,0366,865; 2015,0114,383; and U.S. Pat. Nos. 2,484,239; 2,985,164; 3,005,451; 3,094,113; 3,611,912; D413,229; 4,210,118; 4,616,624; 4,677,964; 4,729,535; 5,076,256; 5303692; 5,472,164; 5,623,866; 5,640,949; 5,970,971; 6,302,097; 6,439,220; 6,578,568; 6,684,877; 6,805,113; 7,284,549; 7,762,249; 7,958,882; 9,187,108.

U.S. Patent Application No. 2002,0020,405 filed by Colman, McNair, Morgan Shaples and Kin, discloses a portable barbeque grill, having a hood and a fire box, incorporating a support structure comprising of a frame, arranged to hold said fire box, supported by a leg assembly that is fixed to the frame such that the leg assembly is movable between a retracted position and an extended position. This application does not appear to disclose a grill and camping gear mounting stand, incorporating a telescoping, height-adjustable tube, with two ends, wherein the first end has been designed to accept, for positioning on the ground, an auger bit or a land stand, and the second end has been designed to accept an interchangeable mounting hub utilizing either screws or collapsible magnetic arms to hold barbeque grills and other camping gear.

U.S. Patent Application No. 2011,0079,209 filed by Bruno, Choi and Siazo, discloses a cart suitable for supporting a grill, including a grill bowl; wherein said cart has two union members with curved channels for receiving tubular, U-shaped frame members, allowing the union members to be joined together to form a ridged support structure. This application does not appear to disclose a grill and camping gear mounting stand, incorporating a telescoping, height-adjustable tube, with two ends, wherein the first end has been designed to accept, for positioning on the ground, an auger bit or a land stand, and the second end has been designed to accept an interchangeable mounting hub utilizing either screws or collapsible magnetic arms to hold barbeque grills and other camping gear.

U.S. Patent Application No. 2014,0366,865 filed by Haberman, discloses a grill riser for preparing foods in an outdoor grill or over an open heating source comprising of two plates, with mounting holes attached to the upper plate, designed to accept a grill, connected with four legs, in pairs utilizing a scissoring effect to rise and/or to lower said top plate with a grill mounted to it. This application does not appear to disclose a grill and camping gear mounting stand, incorporating a telescoping, height-adjustable tube, with two ends, wherein the first end has been designed to accept, for positioning on the ground, an auger bit or a land stand, and the second end has been designed to accept an interchangeable mounting hub utilizing either screws or collapsible magnetic arms to hold barbeque grills and other camping gear.

U.S. Patent Application No. 2015,0114,383 filed by Jen Lin, discloses a portable barbeque grill including an oven and supporting members comprising of a panel and two stands, in cross connection with the first stand, designed to pivot on the first stand, wherein one end of the first stand pivots on a bottom of the panel, and one end of the second stand is fixed with the bottom of the panel. This application does not appear to disclose a grill and camping gear mounting stand, incorporating a telescoping, height-adjustable tube, with two ends, wherein the first end has been designed to accept, for positioning on the ground, an auger bit or a land stand, and the second end has been designed to accept an interchangeable mounting hub utilizing either screws or collapsible magnetic arms to hold barbeque grills and other camping gear.

U.S. Pat. No. 2,484,239 filed by Moon and Moon, discloses a portable and foldable grill comprising of a fire box with a supporting, collapsible frame and attached thereto wheels designed to make the repositioning of said grill both quick and effortless. This patent is not disclosing a grill and camping gear mounting stand, incorporating a telescoping, height-adjustable tube, with two ends, wherein the first end has been designed to accept, for positioning on the ground, an auger bit or a land stand, and the second end has been designed to accept an interchangeable mounting hub utilizing either screws or collapsible magnetic arms to hold barbeque grills and other camping gear.

U.S. Pat. No. 2,985,164 filed by Imoto, discloses a collapsible camp stove incorporating four functioning sides and a bottom surface, designed to open and form a rectangular-shaped barbeque style stove, wherein said camp stove is capable of folding in a small portable unit resembling a briefcase. This patent is not disclosing a grill and camping gear mounting stand, incorporating a telescoping, height-adjustable tube, with two ends, wherein the first end has been designed to accept, for positioning on the ground, an auger bit or a land stand, and the second end has been designed to accept an interchangeable mounting hub utilizing either screws or collapsible magnetic arms to hold barbeque grills and other camping gear.

U.S. Pat. No. 3,005,451 filed by Lester, discloses a portable barbeque grill utilizing collapsible legs, capable of folding into a small section, reducing the necessary storage space and making simplifying the transportation thereof. As such, this patent is not disclosing a grill and camping gear mounting stand, incorporating a telescoping, height-adjustable tube, with two ends, wherein the first end has been designed to accept, for positioning on the ground, an auger bit or a land stand, and the second end has been designed to accept an interchangeable mounting hub utilizing either screws or collapsible magnetic arms to hold barbeque grills and other camping gear.

U.S. Pat. No. 3,094,113 filed by Avila, discloses an outdoor cooking unit comprising of a round base designed to accept a vertical shaft, made to accept and to support, by using shaft collars, various cooking components including but not limited to a barbeque-capable cooking pot, food trays and other related devices. This patent is not disclosing a grill and camping gear mounting stand, incorporating a telescoping, height-adjustable tube, with two ends, wherein the first end has been designed to accept, for positioning on the ground, an auger bit or a land stand, and the second end has been designed to accept an interchangeable mounting hub utilizing either screws or collapsible magnetic arms to hold barbeque grills and other camping gear.

U.S. Pat. No. 3,611,912 filed by Choc, discloses a portable hot coal grill which is adapted to provide either top heat or side heat; said grill comprises a boxlike storage container which is transversely split and hinged along one side so when opened it creates a counter top. This patent is not disclosing a grill and camping gear mounting stand, incorporating a telescoping, height-adjustable tube, with two ends, wherein the first end has been designed to accept, for positioning on the ground, an auger bit or a land stand, and the second end has been designed to accept an interchangeable mounting hub utilizing either screws or collapsible magnetic arms to hold barbeque grills and other camping gear.

U.S. Pat. No. D413,229 filed by Hopkins, Wagner and Brant, discloses an ornamental design for a shelf utilized as a barbeque grill stand. This patent is not focusing on the utility aspects of the design. Moreover, this patent is not disclosing a grill and camping gear mounting stand, incorporating a telescoping, height-adjustable tube, with two ends, wherein the first end has been designed to accept, for positioning on the ground, an auger bit or a land stand, and the second end has been designed to accept an interchangeable mounting hub utilizing either screws or collapsible magnetic arms to hold barbeque grills and other camping gear.

U.S. Pat. No. 4,210,118 filed by Davis and Beer, discloses portable barbecue cooking stove apparatus, incorporating wheels for ease of mobility, having scissor action support legs pivotally joined together and to the stove, in extended position said support legs permit the user to cook in upright position, and allows for an easy process of folding said apparatus. This patent is not disclosing a grill and camping gear mounting stand, incorporating a telescoping, height-adjustable tube, with two ends, wherein the first end has been designed to accept, for positioning on the ground, an auger bit or a land stand, and the second end has been designed to accept an interchangeable mounting hub utilizing either screws or collapsible magnetic arms to hold barbeque grills and other camping gear.

U.S. Pat. No. 4,616,624 filed by Parker, discloses a portable barbecue grill utilizing a circular base with a center-mounted shaft, having both a bottom and a top end, protruding vertically from said base where the bottom end is attached to said base and the top end is designed to support a barbeque grill, capable of disassembly into a compact state for travel or for storage in a limited space. This patent is not disclosing a grill and camping gear mounting stand, incorporating a telescoping, height-adjustable tube, with two ends, wherein the first end has been designed to accept, for positioning on the ground, an auger bit or a land stand, and the second end has been designed to accept an interchangeable mounting hub utilizing either screws or collapsible magnetic arms to hold barbeque grills and other camping gear.

U.S. Pat. No. 4,677,964 filed by Lohmeyer, Schlosser, Tucker, Stephen, Leja, Beecher, discloses a portable gas grill having a cart and a cooking vessel supported on the cart with the cooking vessel having a lower gas burner assembly, an intermediate sear grid assembly and an upper cooking grid. The sear grid assembly includes inverted V-shaped sear bars that cause evaporation of greases from the food on the cooking grid. This patent is not disclosing a grill and camping gear mounting stand, incorporating a telescoping, height-adjustable tube, with two ends, wherein the first end has been designed to accept, for positioning on the ground, an auger bit or a land stand, and the second end has been designed to accept an interchangeable mounting hub utilizing either screws or collapsible magnetic arms to hold barbeque grills and other camping gear.

U.S. Pat. No. 4,729,535 filed by Frazer and Sorenson, discloses an apparatus for supporting a cooking device, including barbeques, designed to connect to a shaft which in turn is mounted to a conventional structure such as the rail of a boat by means of a mounting bracket. This patent is not disclosing a grill and camping gear mounting stand, incorporating a telescoping, height-adjustable tube, with two ends, wherein the first end has been designed to accept, for positioning on the ground, an auger bit or a land stand, and the second end has been designed to accept an interchangeable mounting hub utilizing either screws or collapsible magnetic arms to hold barbeque grills and other camping gear.

U.S. Pat. No. 5,076,256 filed by Raymer and Wells, discloses an easily assembled barbecue grill with detachable accessory shelves and snap-in wheels, wherein said shelves are attachable and detachable without the use of any tools and/or fasteners, and once assembled said shelves can be rotated and folded into shape most advantages for storing. This patent is not disclosing a grill and camping gear mounting stand, incorporating a telescoping, height-adjustable tube, with two ends, wherein the first end has been designed to accept, for positioning on the ground, an auger bit or a land stand, and the second end has been designed to accept an interchangeable mounting hub utilizing either screws or collapsible magnetic arms to hold barbeque grills and other camping gear.

U.S. Pat. No. 5,303,692 filed by Shasad, discloses a grill stand for use in a conventional fireplace with a grate, for cooking food over the fire, consisting of a metal grid which has legs, which in one position extend through the openings in the fireplace grate to support the grill, and in other position move out of the way for storage, said stand incorporates an adjustable cooking surface. This patent is not disclosing a grill and camping gear mounting stand, incorporating a telescoping, height-adjustable tube, with two ends, wherein the first end has been designed to accept, for positioning on the ground, an auger bit or a land stand, and the second end has been designed to accept an interchangeable mounting hub utilizing either screws or collapsible magnetic arms to hold barbeque grills and other camping gear.

U.S. Pat. No. 5,472,164 filed by Contee, discloses a multiple purpose portable grill hanger which is constructed of tubular aluminum members wherein a horizontally disposed rectangle is formed by the aluminum members for supporting the grill, capable of vertically extending supporting arms over the top of a railing or tailgate of a vehicle. This patent is not disclosing a grill and camping gear mounting stand, incorporating a telescoping, height-adjustable tube, with two ends, wherein the first end has been designed to accept, for positioning on the ground, an auger bit or a land stand, and the second end has been designed to accept an interchangeable mounting hub utilizing either screws or collapsible magnetic arms to hold barbeque grills and other camping gear.

U.S. Pat. No. 5,623,866 filed by Home, discloses a supporting bracket for a grill bowl, comprising of a pair of support brackets supporting the grill bowl, a pair of side tables, a grease tray and four cart legs each having a hole at an upper end thereof, the support brackets each being a generally H-shaped member having two vertical pillars and a beam formed between the two vertical pillars. This patent is not disclosing a grill and camping gear mounting stand, incorporating a telescoping, height-adjustable tube, with two ends, wherein the first end has been designed to accept, for positioning on the ground, an auger bit or a land stand, and the second end has been designed to accept an interchangeable mounting hub utilizing either screws or collapsible magnetic arms to hold barbeque grills and other camping gear.

U.S. Pat. No. 5,640,949 filed by Smith, discloses a portable barbecue grill assembly comprising of a principal support arm projecting horizontally outwardly from the rear of the vehicle to which an ash saucer is attached, and bolts therethrough anchor a kettle-type barbecue grill having a removable dome-shaped cover. This patent is not disclosing a grill and camping gear mounting stand, incorporating a telescoping, height-adjustable tube, with two ends, wherein the first end has been designed to accept, for positioning on the ground, an auger bit or a land stand, and the second end has been designed to accept an interchangeable mounting hub utilizing either screws or collapsible magnetic arms to hold barbeque grills and other camping gear.

U.S. Pat. No. 5,970,971 filed by Chuan Wu, discloses a foldable barbeque device comprising of a housing and two covers pivotally secured to the side portions of the housing. The covers each includes a leg for enclosing the side portions of the housing when the covers are folded to the folded position, and for elevating the housing when the covers are rotated to the open position. This patent is not disclosing a grill and camping gear mounting stand, incorporating a telescoping, height-adjustable tube, with two ends, wherein the first end has been designed to accept, for positioning on the ground, an auger bit or a land stand, and the second end has been designed to accept an interchangeable mounting hub utilizing either screws or collapsible magnetic arms to hold barbeque grills and other camping gear.

U.S. Pat. No. 6,302,097 filed by Rivera, discloses a combination barbecue grill and folding table that is adapted to be manipulated from a fully deployed condition, during which food can be cooked on the grill and then served on an adjacent table, and a collapsed condition, during which the grill and table are folded into a compact package that is suitable for transport and storage. This patent is not disclosing a grill and camping gear mounting stand, incorporating a telescoping, height-adjustable tube, with two ends, wherein the first end has been designed to accept, for positioning on the ground, an auger bit or a land stand, and the second end has been designed to accept an interchangeable mounting hub utilizing either screws or collapsible magnetic arms to hold barbeque grills and other camping gear.

U.S. Pat. No. 6,439,220 filed by Johnson, discloses a frame assembly for a barbecue grill, having at least two U-shaped frame members, each formed of a bended contiguous tubular material, with at least one support member disposed transverse to the U-shaped members attached thereto. This patent is not disclosing a grill and camping gear mounting stand, incorporating a telescoping, height-adjustable tube, with two ends, wherein the first end has been designed to accept, for positioning on the ground, an auger bit or a land stand, and the second end has been designed to accept an interchangeable mounting hub utilizing either screws or collapsible magnetic arms to hold barbeque grills and other camping gear.

U.S. Pat. No. 6,578,568 filed by Dufort and Rstovski, discloses a fire grill with a vertically foldable bracket, comprising of a vertical support that may be driven into the ground or otherwise supported in a vertical position, wherein the vertical support has an adjustable stop which may be set at any desired height, wherein resting on the stop is a sleeve and bracket which in turn supports the grill surface, said vertical support also has a handle whereby the bracket and grill surface can be rotated over and away from a fire below the grill. This patent is not disclosing a grill and camping gear mounting stand, incorporating a telescoping, height-adjustable tube, with two ends, wherein the first end has been designed to accept, for positioning on the ground, an auger bit or a land stand, and the second end has been designed to accept an interchangeable mounting hub utilizing either screws or collapsible magnetic arms to hold barbeque grills and other camping gear.

U.S. Pat. No. 6,684,877 filed by Kuen Wu, discloses a barbecue device includes with front and rear leg members disposed under and pivoted to a support plate; said leg members are pivotable relative to the support plate for moving between a first position, in which lower ends of the leg members are moved away from each other, and a second position, in which the lower ends of the leg members are moved toward each other. This patent is not disclosing a grill and camping gear mounting stand, incorporating a telescoping, height-adjustable tube, with two ends, wherein the first end has been designed to accept, for positioning on the ground, an auger bit or a land stand, and the second end has been designed to accept an interchangeable mounting hub utilizing either screws or collapsible magnetic arms to hold barbeque grills and other camping gear.

U.S. Pat. No. 6,805,113 filed by Stephen, Sieg, Bruno and Choi, discloses a barbecue grill assembly comprising an upper assembly and a lower assembly, with the upper assembly adapted to receive a cooking chamber; wherein the upper and the lower assembly and the lateral assemblies are each formed from a plurality of tubular frame members, forming a shelf-like structure designed to support said barbeque grill. This patent is not disclosing a grill and camping gear mounting stand, incorporating a telescoping, height-adjustable tube, with two ends, wherein the first end has been designed to accept, for positioning on the ground, an auger bit or a land stand, and the second end has been designed to accept an interchangeable mounting hub utilizing either screws or collapsible magnetic arms to hold barbeque grills and other camping gear.

U.S. Pat. No. 7,284,549 filed by Eby and Marci, discloses a portable barbeque grill incorporating a grill and a removable support stand designed to be attached/mounted to a wall and alternatively supported on a horizontal surface such as the ground or a table using the same support stand. This patent is not disclosing a grill and camping gear mounting stand, incorporating a telescoping, height-adjustable tube, with two ends, wherein the first end has been designed to accept, for positioning on the ground, an auger bit or a land stand, and the second end has been designed to accept an interchangeable mounting hub utilizing either screws or collapsible magnetic arms to hold barbeque grills and other camping gear.

U.S. Pat. No. 7,762,249 filed by Johnson, Bruno and DeMars, discloses barbeque grill with a frame and mounting assembly comprising of two frame members, and a mounting assembly having at least two mounting members attached to the firebox, wherein the first mounting member is directly connected to the first frame member and the second mounting member is directly connected to the second frame member to create distance between the cooking chamber and the frame assembly to avoid heat damage to the frame assembly during cooking. This patent is not disclosing a grill and camping gear mounting stand, incorporating a telescoping, height-adjustable tube, with two ends, wherein the first end has been designed to accept, for positioning on the ground, an auger bit or a land stand, and the second end has been designed to accept an interchangeable mounting hub utilizing either screws or collapsible magnetic arms to hold barbeque grills and other camping gear.

U.S. Pat. No. 7,958,882 filed by Sgourides, discloses a collapsible barbeque system of rectangular configuration with a gas barbeque unit mounted on a support system comprising of two bi-fold legs, connects near the ground, incorporating two wheels for ease of transportation. This patent is not disclosing a grill and camping gear mounting stand, incorporating a telescoping, height-adjustable tube, with two ends, wherein the first end has been designed to accept, for positioning on the ground, an auger bit or a land stand, and the second end has been designed to accept an interchangeable mounting hub utilizing either screws or collapsible magnetic arms to hold barbeque grills and other camping gear.

U.S. Pat. No. 9,187,108 filed by Bruno, Zelek, Kalisik and Behnke, discloses a folding cart for a grill, the grill having a lid with a handle and two pairs of legs, namely a right and left front leg and a right and left rear leg, with two wheels attached thereto for ease of transportation and an upper support surface for securing thereto a grill. This patent is not disclosing a grill and camping gear mounting stand, incorporating a telescoping, height-adjustable tube, with two ends, wherein the first end has been designed to accept, for positioning on the ground, an auger bit or a land stand, and the second end has been designed to accept an interchangeable mounting hub utilizing either screws or collapsible magnetic arms to hold barbeque grills and other camping gear.

SUMMARY OF THE INVENTION

The following is intended to be a brief summary of the invention and is not intended to limit the scope of the invention. NOTE: The present invention, titled and referred herein as "the adjustable stand for barbeque grills and other camping gear" may also be referred to as "the barbecue anchor auger stand" as both terminologies accurately reflect the available options of the presented herein product, and both are in accordance with an exemplary embodiment of the present invention.

The invention is a sturdy, yet flexible, support platform for barbecues grills, picnic tables and other camping accessories. The invention comprises of two main components: 1) the adjustable mounting hub; 2) the telescoping height-adjustment tube with an auger bit. The versatile mounting hub can be mounted directly to any accessory with fours screws, or it could be outfitted with magnetic collapsible pivot arms to support metallic accessories. The telescoping tube with an auger bit, permits the user to firmly anchor the system in the ground and to set the desired height for the support platform. The invention can be utilized on the beaches, campgrounds, backyards and in the water.

DESCRIPTIVE KEY

Adjustable stand for barbeque grills and other camping gear assembly 10
Barbecue grill 12
Telescoping height-adjustment tube 14
Tube holes 16
Earth anchor auger shaft 18
Shaft holes 20
Auger bit 21
Bull's-eye bubble level 22
Drive pin wrench 24
Mounting hub 26
Collapsible pivot arms 28
Magnetic discs 30
Hub-to-tube fitting 32
Fitting hole 34
Quick release pin 36
Layered chain 38
Metal key ring 40
Land stand assembly 50
Land stand vertical shaft 52
Land stand vertical shaft mounting bolt 54
Land stand floor plate 56
Land stand leveling threaded holes 58
Heat plate 60
Heat plate mounting clearance holes 62.

BRIEF DESCRIPTION OF THE DRAWINGS

The components shown in the drawings are not to scale. In the interest of clarity, some of the components might be shown in a generalized form and could be identified utilizing commercial designations. All components, including its essential features, have been assigned reference numbers that are utilized consistently throughout the descriptive process outlined herein:

FIG. 10 is a similar view showing the fully-assembled, top portion of the adjustable stand for barbeque grills and other camping gear, in accordance with an exemplary embodiment of the present invention;

FIG. 11 is a similar view showing the mounting hub with four collapsible pivot arms and magnetic discs attached thereto, attached to the bottom plate of a barbecue grill, in accordance with an exemplary embodiment of the present invention;

FIG. 12 is a similar view showing the mounting hub with four collapsible pivot arms and magnetic discs, supporting a metallic object, such as table or a food tray, in accordance with an exemplary embodiment of the present invention;

FIG. 13 is a similar view showing the mounting hub without the collapsible pivot arms, attached with four screws to a nonmetallic object, such as a barbecue grill, table or a food tray, in accordance with an exemplary embodiment of the present invention;

FIG. 14 is a perspective view showing the adjustable stand for barbeque grills and other camping gear, supporting a barbeque grill via a heat plate, in accordance with an exemplary embodiment of the present invention;

FIG. 15 is a perspective view showing the heat plate, in accordance with an exemplary embodiment of the present invention;

FIG. 16 is a perspective view showing the adjustable stand for barbeque grills and other camping gear, using the auger bit, mounted to a chair, in accordance with an exemplary embodiment of the present invention;

FIG. 17 is a perspective view showing the adjustable stand for barbeque grills and other camping gear, using the auger bit, mounted to a table top, in accordance with an exemplary embodiment of the present invention;

FIG. 18 is a perspective view showing the adjustable stand for barbeque grills and other camping gear, using the auger bit, mounted to an umbrella, in accordance with an exemplary embodiment of the present invention;

FIG. 19 is a perspective view showing the adjustable stand for barbeque grills and other camping gear, using the auger bit, mounted to an ice bucket filled with exemplary beverages, in accordance with an exemplary embodiment of the present invention.

DETAILED DESCRIPTION OF THE PREFERRED EMBODIMENT

The following description references to the above-defined drawings and represents only an exemplary embodiment of the invention. It is foreseeable, and recognizable by those skilled in the art, that various modifications and/or substitutions to the invention could be implemented without departing from the scope and the character of the invention.

Figures 1, 1A:
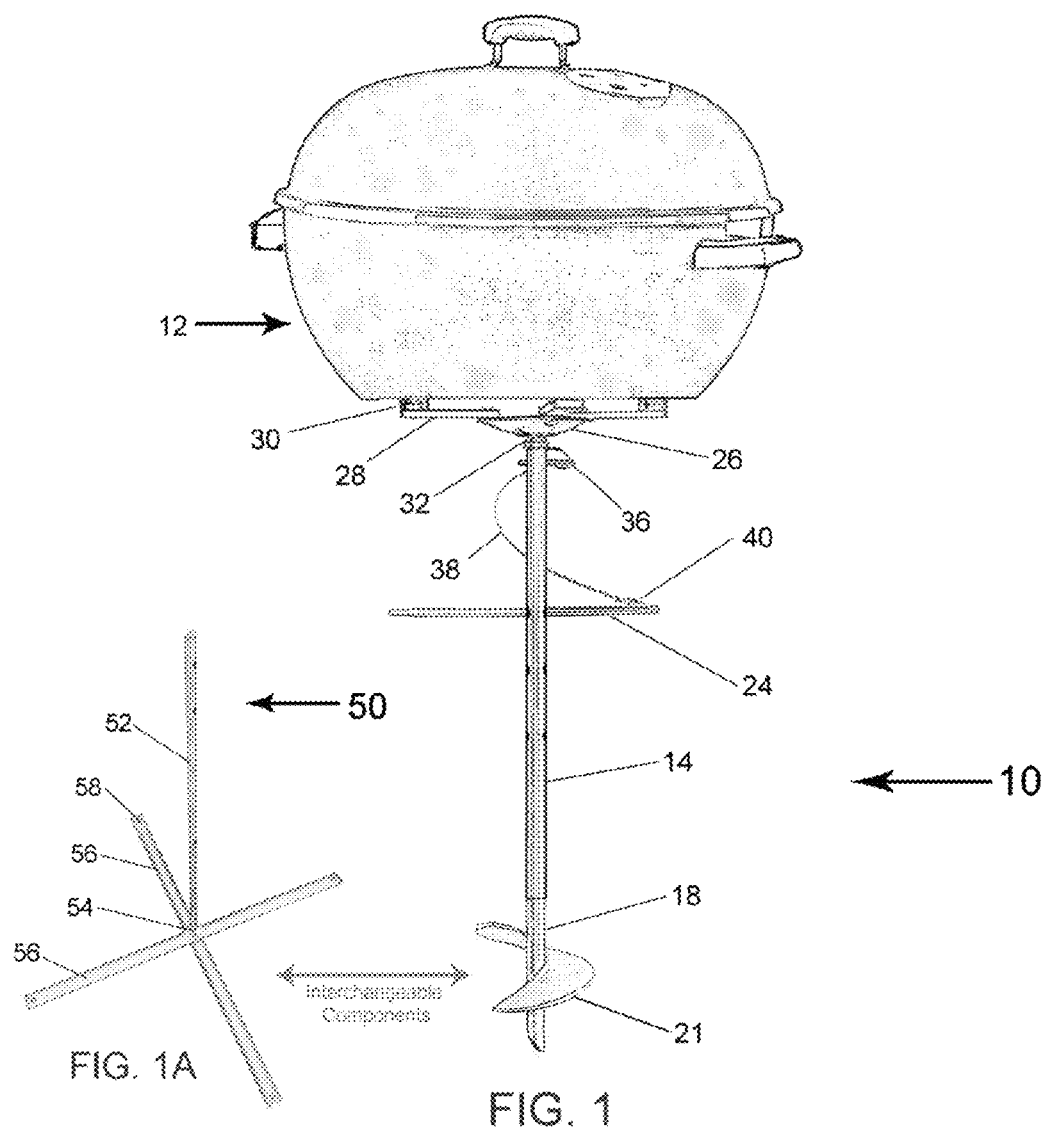
FIG. 1 is a perspective view of the adjustable stand for barbeque grills and other camping gear with an auger bit, in accordance with an exemplary embodiment of the present invention.
FIG. 1A is a perspective view of the land stand assembly, designed to be an interchangeable components with the auger bit, in accordance with an exemplary embodiment of the present invention.

FIG. 1 shows the adjustable stand for barbeque grills and other camping gear assembly 10 in accordance with the invention, supporting a barbecue grill 12. The adjustable stand assembly 10, includes a telescoping height-adjustment tube 14, earth anchor auger shaft 18 with an auger bit 21, drive pin wrench 24, mounting hub 26, four collapsible pivot arms 28, four magnetic discs 30, hub-to-tube fitting 32, quick release pin 36, layered chain 38 and two metal key rings 40.

The stand also incorporates optional, interchangeable components, which include the land stand assembly 50, comprising of a vertical shaft 52, vertical shaft mounting bolt 54, two floor plates 56, leveling threaded holes 58, as shown in FIG. 1A; plus a heat plate 60, incorporating four clearance holes for the mounting purposes, as shown in FIG. 15.

Figure 2:
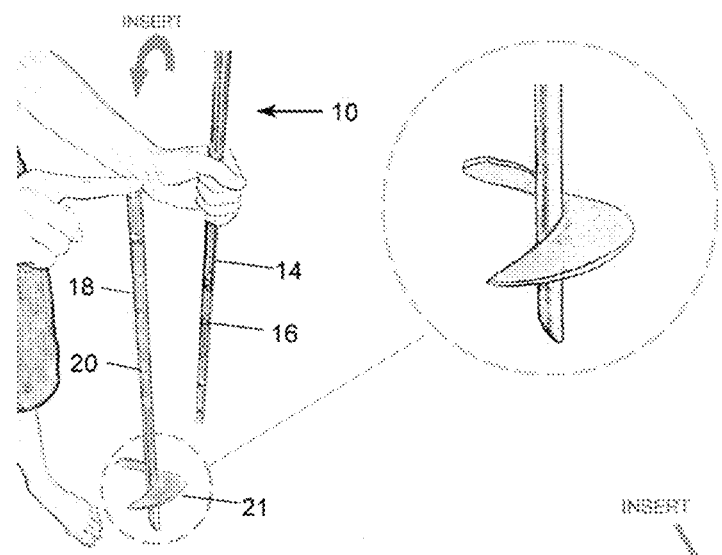
FIG. 2 is a perspective view showing the initial stage of assembling the adjustable stand for barbeque grills and other camping gear, specifically, insertion of the telescoping height-adjustment tube over the earth anchor auger shaft, in accordance with an exemplary embodiment of the present invention.
Figure 3:
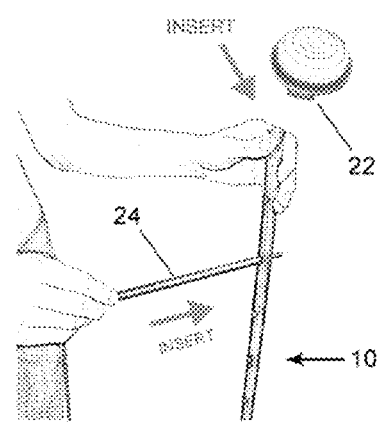
FIG. 3 is a similar view showing the insertion process, on top of the telescoping height-adjustment tube, of the bull's-eye bubble level, and insertion of the drive pin wrench in the side of the height-adjustment tube, in accordance with an exemplary embodiment of the present invention.

FIG. 2 shows the first step in assembling the adjustable stand 10. This step requires insertion of the telescoping height-adjustment tube 14 over the earth anchor auger shaft 18. By sliding up or down the telescoping height-adjustment tube 14, the user may choose the desired height of the stand 10. Once the desired height is selected, the user locks this position in place by lining up the tube hole 16 with the shaft hole 20, and inserting through them the drive pin wrench 24, as shown in FIG. 3.

Figure 4:
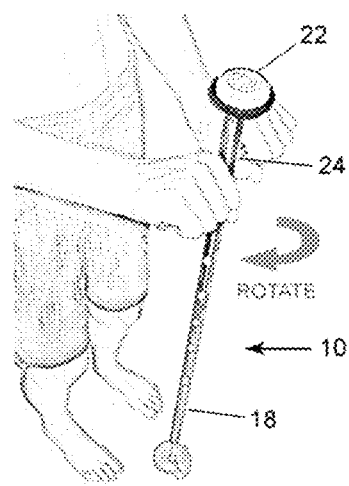
FIG. 4 is a similar view showing the adjustable stand for barbeque grills and other camping gear being rotated by the user in a clockwise direction, causing the assembly to be anchored into the ground, in accordance with an exemplary embodiment of the present invention.

Next, the users will drive the earth anchor auger shaft 18 into the ground by holding the drive pin wrench 24 and rotating the barbecue anchor auger stand 10 in a clockwise direction, see FIG. 4. To ensure straight vertical insertion, the user may install the bull's-eye bubble level 22, as shown in FIG. 3 and FIG. 4.

Figure 5:
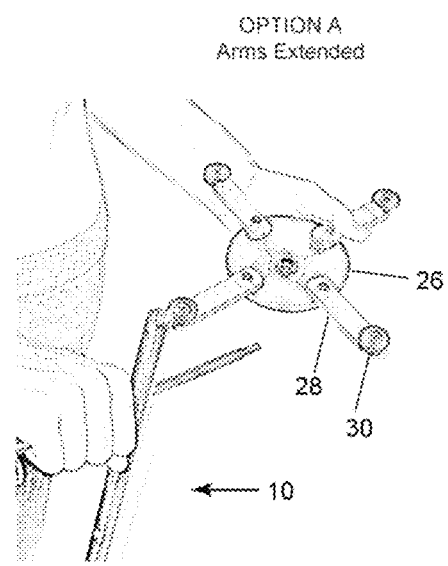
FIG. 5 is a similar view showing the bull's-eye bubble level removed from the telescoping height-adjustment tube and the selection of the mounting hub containing four collapsible pivot arms with magnetic discs, in accordance with an exemplary embodiment of the present invention.
Figure 6:
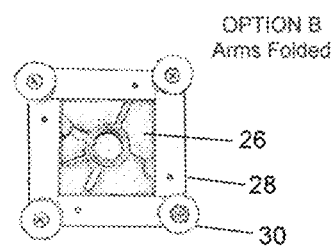
FIG. 6 is a perspective view of the mounting hub with the collapsible pivot arms folded, in accordance with an exemplary embodiment of the present invention.
Figure 7:
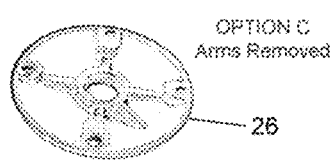
FIG. 7 is a similar view showing the mounting hub with the collapsible pivot arms removed, exposing the four clearance holes used for attaching the hub, by using screws, directly to nonmetallic surfaces, in accordance with an exemplary embodiment of the present invention.

The user may choose to place the stand 10 on a flat surface, such as a parking lot, in which situation the user will replace the auger bit 21 with the land stand assembly 50, as shown in FIG. 1A Once the barbecue the stand 10 is firmly anchored to the ground, the user removes the bull's-eye bubble level 22, and selects the mounting hub 26, as shown in FIG. 5. Here, the user can modify the mounting hub's 26 configuration, providing the user with three options: A) the mounting hub 26 with four extended collapsible pivot arms 28 with magnetic discs 30, as shown in FIG. 5; B) the mounting hub 26 with folded collapsed pivot arms 28 with magnetic discs 30, as shown in FIG. 6; C) the mounting hub 26 without accessories, as shown in FIG. 7.

Figure 8:
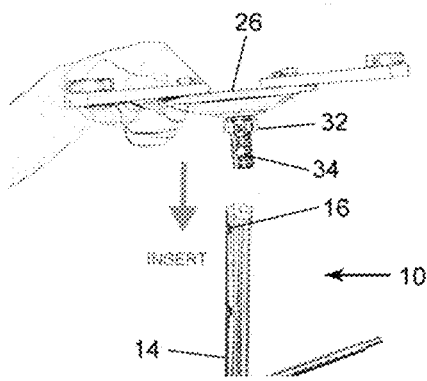
FIG. 8 is a perspective view of the mounting hub with the collapsible pivot arms extended, being attached to the telescoping height-adjustment tube using the hub-to-tube fitting, in accordance with an exemplary embodiment of the present invention.
Figure 9:
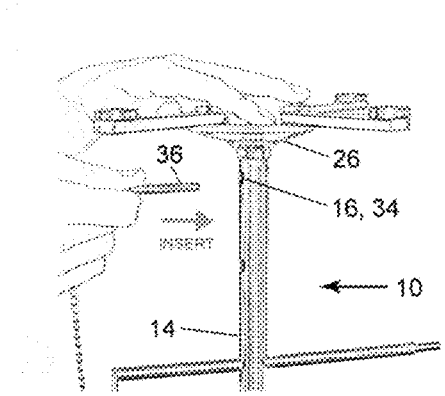
FIG. 9 is a similar view showing the quick release pin being used to secure the mounting hub to the telescoping height-adjustment tube, in accordance with an exemplary embodiment of the present invention.

FIG. 8 shows how the selected mounting hub 26 is inserted into the telescoping height-adjustment tube 14. Here, the user inserts the hub-to-tube fitting 32 into the top end of the telescoping height-adjustment tube 14. To lock these two components in place, the user lines up the fitting hole 34, located in the hub-to-tube fitting 32, with the top tube hole 16 and inserts through them the quick release pin 36, as shown in FIGS. 8 and 9.

FIG. 10 shows the fully-assembled, top portion of the adjustable stand assembly 10. Included in the assembly are also the two metal key rings 40 and the layered chain 38 connecting the quick release pin 36 to the drive pin wrench 24 for safekeeping.

FIGS. 11, 12 and 13, show a wide range of objects that can be supported by the adjustable stand 10. Utilizing the mounting hub 26 with the four extended collapsible pivot arms 28 and magnetic discs 30, the adjustable stand 10 can support a barbecue grill 12, as shown in FIG. 11, or any other metallic object such as a small picnic table or a food tray, as shown in FIG. 12. Objects with nonmetallic properties, can be supported by attaching them directly to the mounting hub 26 with four screws, as shown in FIG. 13, these objects may include a chair, a large table top, an umbrella or an ice bucket, as shown in FIGS. 16, 17, 18 and 19 respectively.

FIGS. 14 and 15 show how the end-user may utilize a heat plate 60. The heat plate is mounted to a grill 12 using bolts and provided clearance holes 62. The heat plate ensures that the surface contacting the magnetic discs 30 is cool, preventing demagnetization of said magnetic discs 30.

What is claimed is:

1. Adjustable stand for barbeque grills and other camping gear, comprising:
   a. an earth anchor auger shaft, having a long center body, a first end and a second end, wherein said first end has an auger bit permanently attached to it, the second end has a chamfered shape, the long center body has a multitude of shaft holes penetrating completely positioned at predetermined intervals; and
   b. a telescoping height-adjustable tube, having a long center body, a first end and a second end, wherein the first end has a chamfered edge, the second end has a chamfered edge with a clearance hole near the end designed to accept a quick release pin, the long center body has a multitude of shaft holes penetrating completely positioned at predetermined intervals; and
   c. a drive pin wrench, round in shape, having a first end and a second end, wherein said first end is of reduced diameter and the second end has a hole designed to accept a metal key ring; and
   d. a quick release pin, round in shape, having a first end and a second end, wherein said first end is chamfered containing a retractable steel-made ball, the second end has a through hole designed to accept key ring which serves as a stop; and
   e. a hub-to-tube fitting, tubular in shape, having a short center body, a first end and a second end, wherein said first end has an external thread, the second end has a smooth surface designed to fit inside of said telescoping height-adjustable tube, the short center body has a through clearance hole designed to accept said quick release pin; and
   f. a mounting hub, round in shape, having a center body and an outer perimeter, wherein said center body has a large threaded through hole, the outer perimeter has four small threaded holes designed to accept screws that hold collapsible pivot arms; and
   g. four collapsible pivot arms, rectangular in shape, each having a first end and a second end, wherein said first end has a through clearance hole designed to accept screws attaching it to said mounting hub, and the second end has a through threaded hole designed to accept a screw to hold magnetic discs; and
   h. four magnetic discs, round in shape, having a center body, wherein said center body has positioned in its center a through clearance hole designed to accept a screw that will hold said magnetic discs to said collapsible pivot arms;
   i. wherein said first end of the telescoping height-adjustable tube slides over the top of the second end of the earth anchor auger shaft, allowing it to freely move in up and down direction, permitting the user to set the desired height of the stand, and lock it in place by matching said clearance holes of both the telescoping height-adjustable tube and the earth anchor auger shaft, and driving through said tube and the shaft the drive pin wrench, which allows the user to turn the stand in the counterclockwise direction, driving the auger bit into the ground until firm footing is established, and
   j. wherein the user will connect said mounting hub to the telescoping height-adjustable tube by using the hub-to-tube fitting by threading the first end of said hub-to-tube fitting into the mounting hub and the second end of said hub-to-tube fitting into the telescoping tube, and locking them in place by inserting the quick-release pin through the clearance holes of the second end of the telescoping height-adjustable tube and the short body of the hub-to-tube fitting, and
   k. wherein permitting the user to attach to said mounting hub, by using screws, any object which nonmetallic properties, such chairs, tabletops or barbeque grills, and where objects with metallic components need be supported by said adjustable stand, the user may attach the collapsible pivot arms by driving screws thorough the clearance holes located at the first end of each collapsible pivot arm into the small threaded holes located on the outer perimeter of the mounting hub, and attaching to said arms the magnetic discs by driving screws through the center holes of each said magnetic disc into the threaded holes located at the second end of the collapsible pivot arm; once said pivoting arms with the magnets are attached, the user my adjust the pivot arms and use the magnetic disc to support barbeque grills and other camping gear.

2. The adjustable stand for barbeque grills and other camping gear of claim 1 further comprising of:
   a. a land stand shaft, having a long center body, a first end and a second end, wherein the first end has threaded hole inside of it the second end has a chamfered edge, the long center body has a multitude of shaft holes penetrating completely positioned at predetermined intervals, designed to match the holes in the body of the telescoping height-adjustment tube, and
   b. two land stand floor plates, each having a center, a first end and a second end, wherein the center has a through clearance hole, the first and the second end have a single through threaded hole;
   c. wherein said land stand floor plates are place on top on each other, with said center clearance holes lined-up, allowing for attachment of said floor plates with the land stand shaft by driving a screw through the plates into the threaded hole located in the first end of said land stand shaft forming a land stand assembly, wherein said earth anchor auger shaft can be replaced with said land stand assembly and used to support barbeque grills and other camping gear on a paved parking lot and other flat surfaces.

3. The adjustable stand for barbeque grills and other camping gear of claim 1 further comprising of:
   a. a heat plate, having a bottom plate, and two side, wherein the bottom plate has to clearance holes;
   b. wherein the heat plate is attached to a barbeque grill or other camping gear, with screws driven through said clearance holes, allowing said adjustable stand, using the pivoting arms with the magnetic discs, to hold said heat plate and to support said camping gear.

\* \* \* \* \*